US012328266B2

(12) United States Patent
Yin et al.

(10) Patent No.: US 12,328,266 B2
(45) Date of Patent: Jun. 10, 2025

(54) FLOW CONTROL METHOD, APPARATUS, AND DEVICE, AND COMPUTER-READABLE STORAGE MEDIUM

(71) Applicant: HUAWEI TECHNOLOGIES CO., LTD., Shenzhen (CN)

(72) Inventors: Weilin Yin, Nanjing (CN); Yongping Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 116 days.

(21) Appl. No.: 18/185,499

(22) Filed: Mar. 17, 2023

(65) Prior Publication Data

US 2023/0300082 A1    Sep. 21, 2023

(30) Foreign Application Priority Data

Mar. 18, 2022   (CN) .......................... 202210273279.5

(51) Int. Cl.
*H04L 47/625* (2022.01)
*H04L 47/10* (2022.01)
*H04L 47/20* (2022.01)

(52) U.S. Cl.
CPC ............ *H04L 47/627* (2013.01); *H04L 47/20* (2013.01); *H04L 47/29* (2013.01)

(58) Field of Classification Search
CPC ........ H04L 47/627; H04L 47/20; H04L 47/29
USPC ....................................................... 709/238
See application file for complete search history.

(56) References Cited

U.S. PATENT DOCUMENTS

| 7,860,009 B2 * | 12/2010 | Pike ..................... H04L 47/2408 370/235 |
| 2005/0108444 A1 | 5/2005 | Flauaus et al. |
| 2006/0083185 A1 * | 4/2006 | Wang ..................... H04L 49/352 370/299 |
| 2008/0304503 A1 | 12/2008 | Blake |

(Continued)

FOREIGN PATENT DOCUMENTS

CN    109660468 B  *  8/2022  ............. H04L 47/20

OTHER PUBLICATIONS

IEEE Std 802.3™—2018, "IEEE Standard for Ethernet", Revision of IEEE Std 802.3-2015, IEEE Standards Association, IEEE Computer Society, Aug. 31, 2018, ISBN 978-5044-5090-4, 5600 pages.

(Continued)

*Primary Examiner* — Wing F Chan
*Assistant Examiner* — John Fan
(74) *Attorney, Agent, or Firm* — Maier & Maier, PLLC

(57) ABSTRACT

A flow control method, apparatus, and device, and a computer-readable storage medium, and belongs to the field of communication technologies. The method includes: determining, by a flow control apparatus, a first backpressure level of a first port, where the first backpressure level indicates a congestion degree of the first port; determining a flow control policy corresponding to the first backpressure level, where the flow control policy is determined based on a user type and a user traffic attribute; and controlling, according to the flow control policy, traffic entering a cache queue of the first port, where different backpressure levels correspond to different flow control policies. The flow control policy is determined based on a user type and a user traffic attribute, and a granularity of flow control is refined to traffic of every user type.

17 Claims, 3 Drawing Sheets

(56) References Cited

U.S. PATENT DOCUMENTS

2009/0323526 A1\* 12/2009 Pike ........................ H04L 47/12
370/235
2021/0168095 A1\* 6/2021 Li ........................ H04L 47/627

OTHER PUBLICATIONS

IEEE Std 802.1Qbb™—2011, "Media Access Control (MAC) Bridges and Virtual Bridged Local Area Networks, Amendment 17: Priority-Based Flow Control", Amendment to IEEE Std 802.1Q™—2011 as amended by IEEE 802.1Qbe™—2011 and IEEE Std 802.1Qbc™—2011, IEEE Standards Association, IEEE Computer Society, Sep. 30, 2011, ISBN 978-0-7381-6657-5, 40 pages.

\* cited by examiner

FLOW CONTROL METHOD, APPARATUS, AND DEVICE, AND COMPUTER-READABLE STORAGE MEDIUM

CROSS-REFERENCE TO RELATED APPLICATIONS

This application claims priority to Chinese Patent Application No. 202210273279.5, filed on Mar. 18, 2022, which is hereby incorporated by reference in its entirety.

TECHNICAL FIELD

The embodiments relate to the field of communication technologies, a flow control method, apparatus, and device, and a computer-readable storage medium.

BACKGROUND

In a data transmission process, when a volume of transmitted data is greater than a load capacity of a transmission channel, network congestion occurs and causes a packet loss, a delay increase, or the like. Therefore, a flow control method is required to ensure quality of service (QoS) of data transmission.

A flow control method in the related art is a priority-based flow control (PFC) technology. Eight virtual channels are provided through division from a transmission port, and transmission priorities of the eight virtual channels are determined. When an occupation ratio of cached data in a buffer of the transmission port is not less than a backpressure threshold, a virtual channel from the transmission port is controlled, based on the transmission priorities, to stop transmitting data.

However, in the foregoing flow control method, data transmission at the transmission port can be managed only based on the priorities of the eight virtual channels, which is low in precision and low in flexibility.

SUMMARY

The embodiments may provide a flow control method, apparatus, and device, and a non-transitory computer-readable storage medium, to resolve problems in the related art.

According to a first aspect, a flow control method is provided. The method includes: determining, by a flow control apparatus, a first backpressure level of a first port, where the first backpressure level indicates a congestion degree of the first port; determining a flow control policy corresponding to the first backpressure level, where the flow control policy is determined based on a user type and a user traffic attribute; and controlling, according to the flow control policy, traffic entering a cache queue of the first port, where different backpressure levels correspond to different flow control policies.

The first backpressure level may be determined based on the congestion degree of the first port, and traffic entering the cache queue of the first port is controlled according to the flow control policy corresponding to the first backpressure level. The flow control policy is determined based on a user type and a user traffic attribute, and a granularity of flow control is refined to every user type. Therefore, the flow control method is highly flexible, has high precision, and has a small impact range of flow control.

In a possible implementation, the determining, by a flow control apparatus, a first backpressure level of a first port includes: determining, according to a case that a length of the cache queue of the first port is not less than a target backpressure generation threshold in at least one backpressure generation threshold, that a backpressure level corresponding to the target backpressure generation threshold is the first backpressure level, where different backpressure levels correspond to different backpressure generation thresholds. The target backpressure generation threshold is determined from the at least one backpressure generation threshold based on the length of the cache queue of the first port, and then the first backpressure level is determined. The determined first backpressure level has high precision.

In a possible implementation, the traffic entering the cache queue of the first port includes first user traffic and second user traffic that are of different user types, and a level of a user traffic attribute of the first user traffic is lower than a level of a user traffic attribute of the second user traffic; the determining a flow control policy corresponding to the first backpressure level includes: determining that the flow control policy corresponding to the first backpressure level is a first flow control policy; and the controlling, according to the flow control policy, traffic entering a cache queue of the first port includes: suppressing, according to the first flow control policy, the first user traffic from entering the cache queue of the first port. Flow control is performed based on a dimension of a user type, so that the control of the traffic entering the cache queue of the first port based on the user type is more targeted, and an impact range of flow control is small.

In a possible implementation, the suppressing, according to the first flow control policy, the first user traffic from entering the cache queue of the first port includes: controlling the first user traffic to enter the cache queue of the first port based on a first transmission ratio, and controlling the second user traffic to enter the cache queue of the first port based on a second transmission ratio, where the first transmission ratio and the second transmission ratio are determined based on the user traffic attribute of the first user traffic and the user traffic attribute of the second user traffic, and the first transmission ratio is lower than the second transmission ratio. Traffic of different user traffic attributes corresponds to different transmission ratios, and a transmission ratio (the second transmission ratio) of traffic of a high level of user traffic attribute is higher than a transmission ratio (the first transmission ratio) of traffic of a low level of user traffic attribute, thereby ensuring transmission performance of traffic of a high level of user traffic attribute.

In a possible implementation, the first user traffic includes first traffic and second traffic that are of different user traffic attributes, and the controlling the first user traffic to enter the cache queue of the first port based on a first transmission ratio includes: controlling the first traffic to enter the cache queue of the first port based on the first transmission ratio, where a level of a user traffic attribute of the first traffic is higher than a level of a user traffic attribute of the second traffic. The first user traffic is controlled based on the user traffic attribute. Therefore, a granularity of the flow control is finer, and an impact range of the flow control is smaller.

In a possible implementation, after the controlling, according to the flow control policy, traffic entering a cache queue of the first port, the method further includes: canceling, according to a case that a length of the cache queue of the first port after flow control is not greater than a backpressure cancellation threshold corresponding to the first backpressure level, control of the traffic entering the cache queue of the first port. The control of the traffic entering the cache queue of the first port is canceled in time, thereby improving transmission efficiency of the cache queue of the first port.

In a possible implementation, after the controlling, according to the flow control policy, traffic entering a cache queue of the first port, the method further includes: determining a second backpressure level of the first port based on a length of the cache queue of the first port after flow control, where the second backpressure level is higher than the first backpressure level; determine a flow control policy corresponding to the second backpressure level; and controlling, according to the flow control policy corresponding to the second backpressure level, the traffic entering the cache queue of the first port. After the traffic entering the cache queue of the first port is controlled, it is determined, based on the length of the cache queue of the first port, whether a higher-level flow control policy (the flow control policy corresponding to the second backpressure level) needs to be executed, and the flow control policy executed by the flow control apparatus is flexibly adjusted based on the length of the cache queue of the first port after the flow control, thereby improving flexibility and timeliness of flow control.

In a possible implementation, the user traffic attribute includes at least one of a user level, a traffic volume, and a traffic type. The user traffic attribute is not limited so that universality is high.

According to a second aspect, a flow control apparatus is provided. The apparatus includes: a determining module and a control module.

The determining module is configured to determine a first backpressure level of a first port, where the first backpressure level indicates a congestion degree of the first port.

The determining module is further configured to determine a flow control policy corresponding to the first backpressure level, where the flow control policy is determined based on a user type and a user traffic attribute.

The control module is configured to control, according to the flow control policy, traffic entering a cache queue of the first port, where different backpressure levels correspond to different flow control policies.

In a possible implementation, the determining module is configured to determine, according to a case that a length of the cache queue of the first port is not less than a target backpressure generation threshold in at least one backpressure generation threshold, that a backpressure level corresponding to the target backpressure generation threshold is the first backpressure level, where different backpressure levels correspond to different backpressure generation thresholds.

In a possible implementation, the traffic entering the cache queue of the first port includes first user traffic and second user traffic that are of different user types, and a level of a user traffic attribute of the first user traffic is lower than a level of a user traffic attribute of the second user traffic; the determining module is configured to determine that the flow control policy corresponding to the first backpressure level is a first flow control policy; and the control module is configured to suppress, according to the first flow control policy, the first user traffic from entering the cache queue of the first port.

In a possible implementation, the control module is configured to control the first user traffic to enter the cache queue of the first port based on a first transmission ratio, and control the second user traffic to enter the cache queue of the first port based on a second transmission ratio, where the first transmission ratio and the second transmission ratio are determined based on the user traffic attribute of the first user traffic and the user traffic attribute of the second user traffic, and the first transmission ratio is lower than the second transmission ratio.

In a possible implementation, the first user traffic includes first traffic and second traffic that are of different user traffic attributes, and the control module is configured to control the first traffic to enter the cache queue of the first port based on the first transmission ratio, where a level of a user traffic attribute of the first traffic is higher than a level of a user traffic attribute of the second traffic.

In a possible implementation, the apparatus further includes: a cancellation module, configured to cancel, according to a case that a length of the cache queue of the first port after flow control is not greater than a backpressure cancellation threshold corresponding to the first backpressure level, control of the traffic entering the cache queue of the first port.

In a possible implementation, the determining module is further configured to determine a second backpressure level of the first port based on a length of the cache queue of the first port after flow control, where the second backpressure level is higher than the first backpressure level, and determine a flow control policy corresponding to the second backpressure level; and the control module is further configured to control, according to the flow control policy corresponding to the second backpressure level, the traffic entering the cache queue of the first port.

In a possible implementation, the user traffic attribute includes at least one of a user level, a traffic volume, and a traffic type.

According to a third aspect, a flow control device is provided. The device includes a memory and a processor. The memory stores at least one instruction. The at least one instruction is loaded and executed by the processor, so that the flow control device implements the flow control method according to the first aspect.

According to a fourth aspect, a non-transitory computer-readable storage medium is provided. The non-transitory computer-readable storage medium stores at least one instruction. The at least one instruction is loaded and executed by a processor to implement the flow control method according to the first aspect.

According to a fifth aspect, a computer program product is provided. The computer program product includes a computer program/instructions. The computer program/instructions are executed by a processor, to cause a computer to implement the flow control method according to the first aspect.

According to a sixth aspect, a communication apparatus is provided. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. In addition, when the processor executes the instructions stored in the memory, the processor performs the method according to the first aspect or any one of the possible implementations of the first aspect.

Optionally, there are one or more processors, and there are one or more memories.

Optionally, the memory may be integrated into the processor, or the memory and the processor are separately disposed.

In an implementation process, the memory may be a non-transitory memory, for example, a read-only memory (ROM). The memory and the processor may be integrated on a same chip or may be disposed on different chips. A type of the memory and a manner of disposing the memory and the processor are not limited.

According to a seventh aspect, a chip is provided, including a processor. The processor is configured to call, from a memory, instructions stored in the memory and run the instructions, to cause a communication device on which the chip is installed to perform the methods in the foregoing aspects.

According to an eighth aspect, another chip is provided, including an input interface, an output interface, a processor, and a memory. The input interface, the output interface, the processor, and the memory are connected to each other through an internal connection path. The processor is configured to execute code in the memory. When the code is executed, the processor is configured to perform the methods in the foregoing aspects.

DETAILED DESCRIPTION OF THE EMBODIMENTS

To make objectives, solutions, and advantages clearer, the following further describes implementations in detail with reference to the accompanying drawings.

Figure 1:
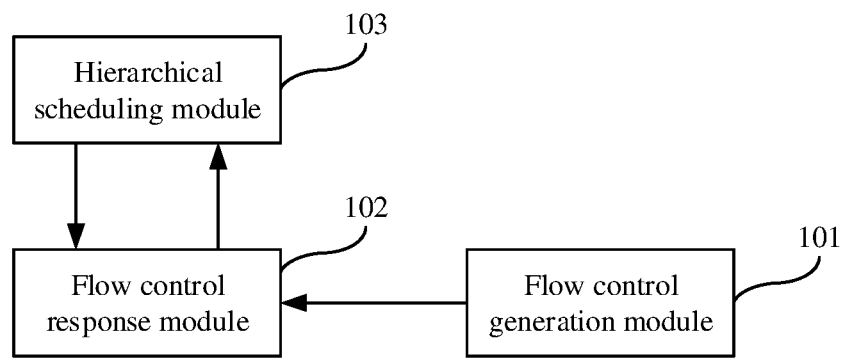
FIG. 1 is a schematic diagram of an implementation environment of a flow control method according to an embodiment.

An embodiment may provide a flow control method. FIG. 1 is a schematic diagram of an implementation environment of the method according to this embodiment. The implementation environment includes: a flow control generation module 101, a flow control response module 102, and a hierarchical scheduling module 103.

Optionally, the flow control generation module 101 is configured to determine a first backpressure level of a first port. The flow control response module 102 is configured to determine a flow control policy corresponding to the first backpressure level. The hierarchical scheduling module 103 is configured to control, according to the flow control policy, traffic entering a cache queue of the first port.

It is to be noted that the flow control generation module 101, the flow control response module 102, and the hierarchical scheduling module 103 may be located in a same flow control apparatus, or may be located in different flow control apparatuses. A network device including the flow control apparatus may be any device that can perform flow control, such as a flow controller, a server, a router, a switch, or a virtual machine.

Figure 2:
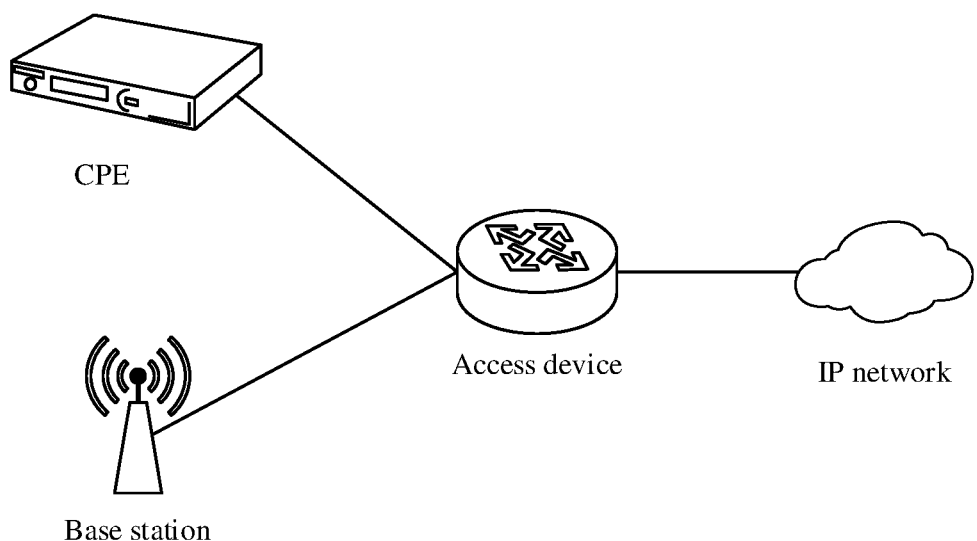
FIG. 2 is a structural diagram of a network topology according to an embodiment.

In addition, the network device including the flow control apparatus may be located in any network structure. For example, as shown in FIG. 2, a network topology includes a base station, customer premises equipment (CPE), an access device, and an internet protocol (IP) network. The access device is a network device including the flow control apparatus, configured to perform the flow control method provided in embodiments. The CPE and the base station are traffic transmission devices, configured to connect users to access the network. Optionally, the traffic transmission device may be the CPE and the base station shown in FIG. 2 or may be another traffic transmission device. One traffic transmission device provides network access for one or more users. This is not limited in embodiments.

Figure 3:
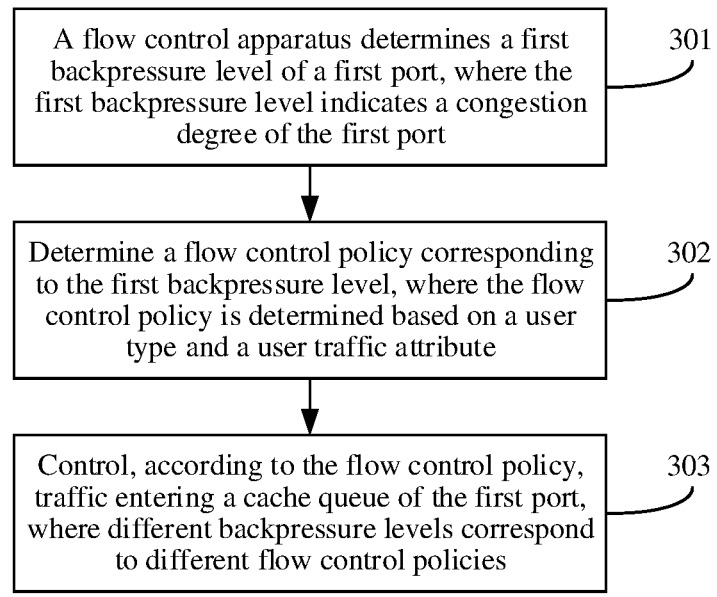
FIG. 3 is a flowchart of a flow control method according to an embodiment.

Based on the implementation environment shown in FIG. 1 and the schematic diagram of the network topology shown in FIG. 2, an embodiment may provide a flow control method. A procedure of the flow control method is shown in FIG. 3, including S301 to S303.

S301: A flow control apparatus determines a first backpressure level of a first port, where the first backpressure level indicates a congestion degree of the first port.

Optionally, the flow control apparatus is located in a network device to perform flow control, for example, the access device shown in FIG. 2. The network device including the flow control apparatus is not limited in the embodiments and may be a broadband remote access server (BRAS) or an edge device or any other network device configured to perform flow control. In a possible implementation, the first port configured to transmit traffic is provided on the network device on which the flow control apparatus is located. For a process in which the first port transmits traffic, for example, the first port provides a cache queue. After receiving to-be-transmitted traffic, the first port caches the traffic in the cache queue, and then transmits the traffic by the cache queue. The traffic received by the first port may be traffic of any type and content that has a transmission requirement.

In a possible implementation, before determining the first backpressure level of the first port, the flow control apparatus further performs the following steps.

Step 1: Divide at least one backpressure level.

For example, at least one reference type is determined based on a user type of traffic entering the cache queue of the first port, and then a backpressure level is determined (divided) based on the reference type. The process of determining the at least one reference type based on the user type is the process of determining the user type included in the reference type. One reference type may include one user type, or may include two user types, or may include more user types. Different reference types include different user types. This is not limited in the embodiments. When the at least one backpressure level is determined based on the reference type, the backpressure level and the reference type are in a one-to-one correspondence. For example, a backpressure level 1 corresponds to a first reference type (the backpressure level 1 is determined according to the first reference type), and a backpressure level 2 corresponds to a second reference type (the backpressure level 2 is determined according to the second reference type).

For a user type of the traffic entering the cache queue of the first port, for example, the user type includes a common user, a VIP (VIP) user, and a slice user. In addition, for traffic of different user types, traffic transmission devices may be the same or may be different. For example, a traffic transmission device corresponding to traffic of a common user and traffic of a slice user is a base station 1, and a traffic transmission device corresponding to traffic of a VIP user is a base station 2. Additionally, the user type may alternatively be determined based on a traffic transmission device. For example, based on different traffic transmission devices, the user type includes a user of a base station of a second generation (2G) mobile communication technology, a user of a base station of long term evolution (LTE) for a universal mobile communication technology, and a user of a base station of a third generation (3rd-generation, 3G) mobile communication technology.

Step 2: Determine a backpressure generation threshold corresponding to each of the at least one backpressure level.

In a possible implementation, the backpressure generation threshold corresponding to each backpressure level may be a value in any unit that is set based on experience, or may be a value with an arrangement rule. For example, a backpressure generation threshold corresponding to a backpressure level A is 50, a backpressure generation threshold corresponding to a backpressure level B is 60, a backpressure generation threshold corresponding to a backpressure level C is 70, and a difference between backpressure generation thresholds corresponding to consecutive backpressure levels is a fixed value. The consecutive backpressure levels mean that no other backpressure level exists in a process in which the flow control apparatus sequentially executes flow control policies corresponding to the two backpressure levels. For example, when a length of the cache queue of the first port reaches the backpressure generation threshold corresponding to the backpressure level A, the flow control apparatus executes a flow control policy corresponding to the backpressure level A on traffic entering the cache queue of the first port. Because the length of the cache queue of the first port after flow control is performed continuously increases and reaches the backpressure generation threshold corresponding to the backpressure level B, the flow control apparatus executes a flow control policy corresponding to the backpressure level B on traffic entering the cache queue of the first port. In this case, the backpressure level A and the backpressure level B are consecutive backpressure levels.

For example, two backpressure levels (a backpressure level 1 and a backpressure level 2) are obtained through division. Backpressure generation thresholds corresponding to different backpressure levels are shown in Table 1.

TABLE 1

| Port identity document (ID) | Backpressure level ID | Backpressure generation threshold (kilobyte (KB)) |
| --- | --- | --- |
| 1 | Backpressure level 2 | 80 |
| 1 | Backpressure level 1 | 60 |

The port ID is used to distinguish different ports, and the backpressure level ID is used to distinguish different backpressure levels. Refer to Table 1. For a port (the first port) with a port ID of 1, a backpressure generation threshold corresponding to a backpressure level 1 is 60 KB, and a backpres sure generation threshold corresponding to a backpres sure level 2 is 80 KB. An execution module for dividing at least one backpressure level and determining a backpressure generation threshold corresponding to each backpressure level is not limited in the embodiments. For example, the execution is carried out, in a media access control (MAC) module or a traffic manager (TM) module, by the flow control generation module in the flow control apparatus shown in FIG. 1.

By determining backpressure generation thresholds corresponding to different backpressure levels, the flow control apparatus may determine the first backpressure level of the first port based on the backpressure generation threshold. In a possible implementation, the process of determining the first backpressure level includes but is not limited to: determining, according to a case that a length of the cache queue of the first port is not less than a target backpressure generation threshold in at least one backpressure generation threshold, that a backpressure level corresponding to the target backpressure generation threshold is the first backpressure level. Different backpressure levels correspond to different backpressure generation thresholds. The backpressure generation threshold shown in Table 1 is used as an example. When the length of the cache queue of the first port reaches 60 KB, the backpressure level 1 (the backpressure level corresponding to the backpressure generation threshold of 60 KB) is determined as the first backpressure level.

In addition to determining the first backpressure level by comparing the length of the cache queue of the first port with the backpressure generation threshold, a current usage ratio of the cache queue of the first port may be further determined based on the length of the cache queue of the first port, and then the current usage ratio of the cache queue of the first port is compared with the backpressure generation threshold in values, to determine the first backpressure level. In this case, a backpressure generation threshold corresponding to each backpressure level is a usage ratio threshold of the cache queue. For example, a backpressure generation threshold corresponding to a backpressure level A is 50%, and a backpressure generation threshold corresponding to a backpressure level B is 60%. After obtaining a length of the cache queue, the flow control apparatus determines, based on the length of the cache queue, that a current usage ratio of the cache queue is 50% and reaches the backpressure generation threshold corresponding to the backpressure level A, and then determines that the backpressure level A is the first backpressure level of the first port.

S302: Determine a flow control policy corresponding to the first backpressure level, where the flow control policy is determined based on a user type and a user traffic attribute.

The flow control policy is not limited in the embodiments, and the process of determining the flow control policy includes but is not limited to the following process.

Step 1: Determine to-be-suppressed traffic corresponding to a first backpressure level.

For example, it is determined that traffic of a user type included in a reference type corresponding to the first backpressure level is to-be-suppressed traffic corresponding to the first backpressure level. For example, if the first backpressure level is a backpressure level 1, and a first reference type corresponding to the backpressure level 1 includes a common user, it is determined that to-be-suppressed traffic corresponding to the first backpressure level is traffic of the common user. In another example, if the first backpressure level is a backpressure level 2, and a second reference type corresponding to the backpressure level 2 includes a VIP user and a common user, it is determined that to-be-suppressed traffic corresponding to the first backpressure level is traffic of the common user and traffic of the VIP user.

Step 2: Determine a transmission ratio of the to-be-suppressed traffic.

In a possible implementation, the transmission ratio indicates a volume of transmitted traffic. For example, a transmission ratio of traffic of a common user is 80%, indicating that 80% of the traffic of the common user is transmitted to the cache queue of the first port. In addition, for a case in which user traffic attributes of to-be-suppressed traffic are different, a transmission ratio of the to-be-suppressed traffic may be determined according to the user traffic attribute based on experience, to ensure that a transmission ratio of traffic of a high level of user traffic attribute is higher than a transmission ratio of traffic of a low level of user traffic attribute. For example, the to-be-suppressed traffic corresponding to the first backpressure level in step 1 is traffic of a common user and traffic of a VIP user. As a level of a user traffic attribute of the traffic of the common user is lower than a level of a user traffic attribute of the traffic of the VIP user, it is determined that a transmission ratio of the traffic of the common user is 40%, and a transmission ratio of the traffic of the VIP user is 80%.

It is to be noted that a transmission ratio of to-be-suppressed traffic may alternatively be 0%. In this case, the flow control policy is controlling the to-be-suppressed traffic not to enter the cache queue of the first port. Therefore, there is no need to perform step 3 of determining a flow control policy based on the user traffic attribute.

Step 3: Based on a user traffic attribute of the to-be-suppressed traffic, determine a flow control policy based on the transmission ratio.

For example, a traffic suppression priority is determined based on a user traffic attribute of the to-be-suppressed traffic, and a flow control policy is determined based on the traffic suppression priority and the transmission ratio. Optionally, based on a level of the user traffic attribute of the to-be-suppressed traffic, traffic of a low level of user traffic attribute is preferentially suppressed. That is, for traffic of a same user type, although an overall transmission ratio remains unchanged, a flow control policy may be further refined for the traffic of the user type based on a user traffic attribute. In a possible implementation, the user traffic attribute includes at least one of a user level, a traffic volume, and a traffic type. For example, a reference type corresponding to a backpressure level includes a common user, and a user traffic attribute includes a user level. The common user is divided into a gold user, a silver user, and a bronze user based on the user level, and traffic of the bronze user of a lowest user level from the common user is preferentially suppressed. That is, when traffic of the common user is suppressed, an overall transmission ratio of the traffic of the common user remains unchanged. However, for the traffic of the common user of different user traffic attributes, traffic suppression priorities are determined based on the user traffic attributes, and suppression modes of the traffic of the common user are further differentiated.

Also, the flow control apparatus may select any one of the foregoing user traffic attributes to determine a traffic suppression priority, or the flow control apparatus may select a plurality of user traffic attributes to determine a traffic suppression priority. For example, a user level, a traffic type, and a traffic volume are selected, and to-be-suppressed traffic corresponding to a backpressure level is traffic of a common user. The common user is divided into a gold user, a silver user, and a bronze user according to different user levels. As the bronze user has a lowest user level, traffic of the bronze user is preferentially suppressed. When the traffic of the bronze user is suppressed, a traffic type of the bronze user includes social traffic and video traffic. Because a level of the social traffic is lower than a level of the video traffic, the social traffic is preferentially suppressed. The social traffic further includes two traffic volumes, namely large traffic and small traffic. Because a level of the large traffic is lower than a level of the small traffic, the large traffic is preferentially suppressed, that is, the large traffic in the social traffic of the bronze user from the common user is preferentially suppressed.

It is to be noted that the foregoing example is intended to describe the process of determining traffic to be preferentially suppressed, instead of limiting a quantity of types of traffic to be preferentially suppressed. The traffic to be preferentially suppressed may be traffic of a type of user traffic attribute in to-be-suppressed traffic. For example, if the to-be-suppressed traffic is of a common user, it is determined to preferentially suppress traffic of a bronze user from the common user. The traffic to be preferentially suppressed may alternatively be traffic of a plurality of types of user traffic attributes. For example, if the to-be-suppressed traffic is traffic of a common user, it is determined to preferentially suppress traffic of a bronze user and traffic of a silver user from the common user. This is not limited in the embodiments.

The division of levels of user traffic attributes varies according to different user traffic attributes. For example, a level of a traffic type is determined based on a requirement of the traffic type on network performance For example, according to different services, the traffic type includes game traffic, video traffic, and social traffic. For the three traffic types, the game traffic has the highest requirement on network performance, the video traffic has the second highest requirement on network performance, and the social traffic has the lowest requirement on network performance Therefore, a sorting result of the foregoing traffic types in descending order of levels is: the game traffic, the video traffic, and the social traffic. With regard to a level of a traffic volume, in a possible implementation, the level of the traffic volume is negatively correlated with the traffic volume. For example, larger traffic has a lower level.

For example, because a user level is used to distinguish traffic of different levels under a same user type, the user level may be determined as a level of a user traffic attribute. A manner of determining the user level is not limited in the embodiments. Optionally, the user level is determined based on a geographical location. For example, a common user includes a common user 1, a common user 2, and a common user 3. Based on levels of cities (geographical locations) in which the common user 1, the common user 2, and the common user 3 are located, it is determined that a level of the common user 3 is the highest, a level of the common user 2 is the second highest, and a level of the common user 1 is the lowest. A level of a city (a geographical location) may be determined based on a population density of the city. For example, the level of the city is positively correlated with the population density of the city. For example, a city with a higher population density has a higher level. Optionally, the user level is determined based on quality of service of a user, and the user level is positively correlated with the quality of service. For example, a VIP user includes a VIP user 1, a VIP user 2, and a VIP user 3 with different VIP levels. The VIP user 3 has the highest VIP level, the VIP user 2 has the second highest VIP level, and the VIP user 1 has the lowest VIP level. Different VIP levels have different rights. For example, users of different VIP levels may adjust different definition when watching a video. When a user of a higher VIP level watches a video, definition of the video is higher, that is, quality of service is higher. Therefore, it is determined, based on the VIP level (quality of service), that the VIP user 3 has the highest user level, the VIP user 2 has the second highest user level, and the VIP user 1 has the lowest user level.

After the traffic suppression priority is determined, the flow control policy may be further determined based on the traffic suppression priority and the transmission ratio. That is, when the to-be-suppressed traffic is controlled to enter the cache queue of the first port based on the transmission ratio, if a transmission ratio of traffic of a same user type remains unchanged, a transmission ratio of each type of traffic included in the user type may be determined based on the traffic suppression priority. For example, the to-be-suppressed traffic is traffic of a common user, and an overall transmission ratio is 60%. When 60% of the traffic of the common user is controlled to enter the cache queue of the first port, with reference to a user level (a user traffic attribute) of the common user, 60% of the traffic of the common user may be selected based on a level of the user traffic attribute. For example, in the traffic of the common user, traffic of a silver user of a high user level accounts for 60%, and traffic of a bronze user of a low user level accounts for 40%. In this case, a flow control policy may include: controlling the traffic of the silver user to enter the cache queue of the first port based on a transmission ratio of 100% (60% of the traffic of the common user), and controlling the traffic of the bronze user to enter the cache queue of the first port based on a transmission ratio of 0% (0% of the traffic of the common user). Alternatively, the flow control policy may include: controlling the traffic of the silver user to enter the cache queue of the first port based on a transmission ratio of 83.33% (50% of the traffic of the common user), and controlling the traffic of the bronze user to enter the cache queue of the first port based on a transmission ratio of 25% (10% of the traffic of the common user). That is, the transmission ratio of the traffic may be determined according to the user traffic attribute based on an empirical value, to ensure that a transmission ratio of traffic of a high level of user traffic attribute is greater than a transmission ratio of traffic of a low level of user traffic attribute.

It is to be noted that a flow control strength of a flow control policy with a high backpressure level is higher than a flow control strength of a flow control policy with a low backpressure level. For the description that the flow control strength of the high backpressure level is higher than the flow control strength of the low backpressure level, refer to the description of flow control strengths of a first backpressure level and a second backpressure level shown in the following embodiment, and details are not described herein again.

In addition, the flow control apparatus may determine the flow control policy corresponding to the first backpressure level according to the foregoing steps, or the flow control apparatus may determine the flow control policy in another manner based on the user type and the user traffic attribute. For example, traffic to be preferentially suppressed is determined based on the user type and the user traffic attribute that correspond to the first backpressure level, and then a transmission ratio of the traffic to be preferentially suppressed is further determined, to obtain a flow control policy corresponding to the first backpressure level. Traffic that does not enter the cache queue of the first port in time may be processed by packet discarding or may be cached first and then transmitted with remaining bandwidth after transmission quality of traffic to be transmitted is ensured. This is not limited in the embodiments.

A time for determining the flow control policy corresponding to the first backpressure level is not limited in the embodiments. The flow control policy may be pre-configured before the flow control apparatus performs flow control. For example, the flow control apparatus configures a flow control policy corresponding to each backpressure level before performing flow control. After determining the first backpressure level, the flow control apparatus determines the flow control policy corresponding to the first backpressure level by searching a pre-configured correspondence between each backpressure level and a flow control policy.

Optionally, the flow control policy may be determined when the flow control apparatus performs flow control. For example, corresponding to-be-suppressed traffic is determined based on the first backpressure level, and a flow control policy of the to-be-suppressed traffic is determined based on control of traffic that currently enters the cache queue of the first port. For example, the flow control apparatus determines that the first backpressure level of the first port is a backpressure level 1 and a reference type corresponding to the backpressure level 1 includes a common user, and then determines that to-be-suppressed traffic is traffic of the common user. Because a transmission state of traffic that currently enters the cache queue of the first port is normal transmission, that is, flow control is not performed on the traffic that enters the cache queue of the first port, it is determined that a flow control policy corresponding to the first backpressure level is controlling traffic of a bronze user of a lowest user level in the traffic of the common user not to enter the cache queue of the first port. In another example, the flow control apparatus determines that the first backpressure level of the first port is a backpressure level 1 and a reference type corresponding to the backpressure level 1 includes a common user, and then determines that to-be-suppressed traffic is traffic of the common user. Because traffic that currently enters the cache queue of the first port does not include traffic of a bronze user of a lowest user level from the common user, it is determined that a flow control policy corresponding to the first backpressure level is controlling traffic of a silver user whose user level is next to that of a bronze user in the traffic of the common user not to enter the cache queue of the first port.

S303: Control, according to the flow control policy, traffic entering a cache queue of the first port, where different backpressure levels correspond to different flow control policies.

In a possible implementation, the traffic entering the cache queue of the first port includes first user traffic and second user traffic that are of different user types, and a level of a user traffic attribute of the first user traffic is lower than a level of a user traffic attribute of the second user traffic. In addition, the flow control apparatus determines, based on the first backpressure level, that a flow control policy corresponding to the first backpressure level is a first flow control policy. In this case, the controlling, according to the flow control policy, traffic entering a cache queue of the first port includes: suppressing, according to the first flow control policy, the first user traffic from entering the cache queue of the first port.

Optionally, the first user traffic is suppressed from entering the cache queue of the first port by sending a first backpressure generation signal and transferring backpressure information based on the first backpressure generation signal, so that an upstream apparatus that sends the first user traffic controls packet sending. In a possible implementation, suppressing the first user traffic from entering the cache queue of the first port is performed by the flow control apparatus shown in FIG. 1. After determining the first backpressure level, the flow control generation module sends the first backpressure generation signal to the flow control response module. The flow control response module adjusts, based on the received first backpressure generation signal, a backpressure state of a user type corresponding to the first backpressure level (a user type of the first user traffic) to that flow control has been performed. The hierarchical scheduling module queries a backpressure state of each user type and stops a scheduling task when the backpressure state is that flow control has been performed, that is, suppresses traffic of the user type of which the backpressure state is that flow control has been performed from entering the cache queue of the first port. Optionally, the flow control response module and the hierarchical scheduling module perform the foregoing operations in a TM module.

For example, the suppressing the first user traffic from entering the cache queue of the first port includes: controlling the first user traffic to enter the cache queue of the first port based on a first transmission ratio, and controlling the second user traffic to enter the cache queue of the first port based on a second transmission ratio, where the first transmission ratio and the second transmission ratio are determined based on the user traffic attribute of the first user traffic and the user traffic attribute of the second user traffic, and the first transmission ratio is lower than the second transmission ratio.

Optionally, when the first user traffic is controlled to enter the cache queue of the first port based on the first transmission ratio, a transmission policy of the second user traffic that is not suppressed may be dynamically adjusted based on a congestion degree of the first port after flow control. The congestion degree of the first port may be determined based on a length of the cache queue of the first port. For example, after the first user traffic is controlled to enter the cache queue of the first port based on the first transmission ratio, the length of the cache queue of the first port no longer increases. In this case, the second user traffic normally enters the cache queue of the first port, that is, the second transmission ratio is 100%. In another example, after the first user traffic is controlled to enter the cache queue of the first port based on the first transmission ratio (60%), the length of the cache queue of the first port continuously increases. In this case, the second user traffic is controlled to enter the cache queue of the first port by 80% (the second transmission ratio). In addition to dynamically adjusting, based on the congestion degree of the first port, the transmission policy of the second user traffic that is not suppressed, the flow control apparatus may also control, when controlling the first user traffic to enter the cache queue of the first port based on the first transmission ratio, the second user traffic to enter the cache queue of the first port based on the second transmission ratio, thereby improving efficiency of relieving network congestion.

In a possible implementation, the first user traffic includes first traffic and second traffic that are of different user traffic attributes. In this case, suppressing the first user traffic from entering the cache queue of the first port based on the first transmission ratio includes, but is not limited to: controlling the first traffic to enter the cache queue of the first port based on the first transmission ratio, where a level of a user traffic attribute of the first traffic is higher than a level of a user traffic attribute of the second traffic. That is, as shown in S302, a traffic suppression priority is determined based on a level of a user traffic attribute, and flow control is performed based on the traffic suppression priority and the transmission ratio. For example, the first user traffic is traffic of a common user, the first traffic is game traffic (accounting for 80% of the first user traffic), the second traffic is social traffic (accounting for 20% of the first user traffic), and the first transmission ratio is 60%. Then, that the first traffic is controlled to enter the cache queue of the first port based on the first transmission ratio is that 75% of game traffic is controlled to enter the cache queue of the first port.

For example, in addition to the controlling the first traffic to enter the cache queue of the first port based on the first transmission ratio shown in the foregoing embodiment, the first traffic may also be controlled to enter the cache queue of the first port based on a transmission ratio 1, and the second traffic may also be controlled to enter the cache queue of the first port based on a transmission ratio 2. A sum of the transmission ratio 1 of the first traffic and the transmission ratio 2 of the second traffic is equal to the first transmission ratio. For example, the first user traffic is traffic of a common user, the first traffic is game traffic (accounting for 80% of the first user traffic), the second traffic is social traffic (accounting for 20% of the first user traffic), and the first transmission ratio is 60%. 62.5% of game traffic and 50% of social traffic are controlled to enter the cache queue of the first port.

It is to be noted that the foregoing example is intended to describe the process in which the flow control apparatus controls the traffic entering the cache queue of the first port, but is not intended to limit the traffic entering the cache queue of the first port. The traffic entering the cache queue of the first port may be the first user traffic and the second user traffic that are of different user types and that are shown in the foregoing embodiment or may be traffic of more user types. This is not limited in the embodiments.

In a possible implementation, after the flow control apparatus controls the traffic entering the cache queue of the first port, the following three cases may occur, and the flow control apparatus may also perform different operations for the following three cases.

Case 1: According to a case that a length of the cache queue of the first port after flow control is not greater than a backpressure cancellation threshold corresponding to the first backpressure level, control of the traffic entering the cache queue of the first port is canceled.

In a possible implementation, when a backpressure generation threshold corresponding to each backpressure level is determined, a backpressure cancellation threshold corresponding to each backpressure level may also be determined. The process of determining the backpressure cancellation threshold is similar to the process of determining the backpressure generation threshold, and details are not described herein again. For example, Table 2 shows a correspondence between each backpressure level and a backpressure threshold (a backpressure generation threshold or a backpressure cancellation threshold).

TABLE 2

| Backpressure level ID | Backpressure generation threshold (KB) | Backpressure cancellation threshold (KB) |
| --- | --- | --- |
| Backpressure level 1 | 60 | 50 |
| Backpressure level 2 | 80 | 70 |

As shown in Table 2, when the first backpressure level is a backpressure level 1, and a length of the cache queue of the first port after flow control is not greater than 50 KB, control of the traffic entering the cache queue of the first port is canceled. Canceling the control of the traffic entering the cache queue of the first port is restoring the transmission policy of the traffic entering the cache queue of the first port before flow control. For example, if a flow control policy corresponding to the first backpressure level is controlling the first traffic not to enter the cache queue of the first port, and before the flow control policy corresponding to the first backpressure level is executed, a transmission policy of the traffic entering the cache queue of the first port is normal transmission, canceling flow control is that the first traffic starts to enter the cache queue of the first port. In another example, a flow control policy corresponding to the first backpressure level is controlling the first traffic to enter the cache queue of the first port based on a first transmission ratio, and before the flow control policy corresponding to the first backpressure level is executed, a transmission policy of the traffic entering the cache queue of the first port is that third traffic enters the cache queue of the first port based on a third transmission ratio. If a level of a user traffic attribute of the third traffic is lower than a level of a user traffic attribute of the first traffic, canceling flow control is controlling the third traffic to enter the cache queue of the first port based on the third transmission ratio.

For example, flow control is canceled by transferring backpressure cancellation information based on a first backpressure cancellation signal, so that an upstream apparatus that sends the first user traffic cancels the flow control. In a possible implementation, the foregoing steps are performed by the flow control apparatus in FIG. 1. After determining the first backpressure level, the flow control generation module sends a first backpressure cancellation signal to the flow control response module when a length of the cache queue of the first port reaches a backpressure cancellation threshold corresponding to the first backpressure level. The flow control response module adjusts, based on the received first backpressure cancellation signal, a backpressure state of a user type corresponding to the first backpressure level to that flow control is not performed. The hierarchical scheduling module queries a backpressure state of each user type, and normally performs a scheduling task when the backpressure state is that flow control is not performed, that is, resumes sending traffic of the user type of which the backpressure state is that flow control is not performed to the cache queue of the first port.

Case 2: According to a case that a length of the cache queue of the first port after flow control is greater than a backpressure cancellation threshold corresponding to the first backpressure level, control of the traffic entering the cache queue of the first port is maintained.

The case 2 refers to a case in which the congestion degree of the first port is not alleviated and does not continuously increase after the traffic entering the cache queue of the first port is controlled. In this case, the flow control apparatus continuously executes the flow control policy corresponding to the first backpressure level.

Case 3: A second backpressure level of the first port is determined based on a length of the cache queue of the first port after flow control, where the second backpressure level is higher than the first backpressure level; a flow control policy corresponding to the second backpressure level is determined; and traffic entering the cache queue of the first port is controlled according to the flow control policy corresponding to the second backpressure level.

The case 3 refers to a case in which the congestion degree of the first port is not alleviated and keeps increasing after the traffic entering the cache queue of the first port is controlled. After a length of the cache queue of the first port reaches a backpressure generation threshold corresponding to a higher backpressure level, higher-level flow control (flow control corresponding to the second backpressure level) is triggered.

The process of determining the flow control policy corresponding to the second backpressure level is similar to the process of determining the flow control policy corresponding to the first backpressure level. The process of controlling, according to the flow control policy corresponding to the second backpressure level, traffic entering the cache queue of the first port is similar to the process of controlling, according to the flow control policy corresponding to the first backpressure level, traffic entering the cache queue of the first port, and details are not described herein again.

It is to be noted that, in addition to the cases shown in the foregoing embodiment, executing the flow control policy corresponding to the second backpressure level may also be that after the flow control apparatus continuously executes the flow control policy corresponding to the first backpressure level for a time threshold, the flow control apparatus executes the flow control policy corresponding to the second backpressure level that is higher than the first backpressure level. Optionally, the time threshold may be set based on an empirical value, and a unit of the time threshold may be any unit, including, but not limited to second, minute, and hour.

In a possible implementation, a flow control strength of the flow control policy corresponding to the second backpressure level is higher than a flow control strength of the flow control policy corresponding to the first backpressure level. This may be expressed as suppressing traffic of a higher level of user traffic attribute from entering the cache queue of the first port. For example, the traffic entering the cache queue of the first port includes traffic of a common user, traffic of a slice user, and traffic of a VIP user. A level of a user traffic attribute of the traffic of the common user is the lowest, a level of a user traffic attribute of the traffic of the slice user is the second highest, and a level of a user traffic attribute of the traffic of the VIP user is the highest. A flow control policy corresponding to the first backpressure level is controlling 60% of the traffic of the common user to enter the cache queue of the first port. A flow control policy corresponding to the second backpressure level is controlling 80% of the traffic of the VIP user and 60% of the traffic of the common user to enter the cache queue of the first port.

Optionally, that the flow control strength of the flow control policy corresponding to the second backpressure level is higher than the flow control strength of the flow control policy corresponding to the first backpressure level may indicate that when traffic of a same level of user traffic attribute is suppressed, a transmission ratio corresponding to the second backpressure level is lower than a transmission ratio corresponding to the first backpressure level. For example, the traffic entering the cache queue of the first port includes traffic of a common user, traffic of a slice user, and traffic of a VIP user. A flow control policy corresponding to the first backpressure level is controlling 60% of the traffic of the common user to enter the cache queue of the first port. A flow control policy corresponding to the second backpressure level is controlling 20% of the traffic of the common user to enter the cache queue of the first port.

Optionally, the foregoing two cases may be combined in that the flow control strength of the flow control policy corresponding to the second backpressure level is higher than the flow control strength of the flow control policy corresponding to the first backpressure level, that is, traffic of a higher level of user traffic attribute is controlled, and transmission ratios of traffic of a same level of user traffic attribute are adjusted. For example, the traffic entering the cache queue of the first port includes traffic of a common user, traffic of a slice user, and traffic of a VIP user. A level of a user traffic attribute of the traffic of the common user is the lowest, a level of a user traffic attribute of the traffic of the slice user is the second highest, and a level of a user traffic attribute of the traffic of the VIP user is the highest. A flow control policy corresponding to the first backpressure level is controlling 60% of the traffic of the common user to enter the cache queue of the first port. A flow control policy corresponding to the second backpressure level is controlling 80% of the traffic of the slice user and 20% of the traffic of the common user to enter the cache queue of the first port.

In addition, after the flow control apparatus executes the flow control policy corresponding to the second backpressure level, three cases (the congestion degree of the first port is alleviated, the congestion degree of the first port is not alleviated and does not increase, and the congestion degree of the first port increases) after the flow control policy corresponding to the first backpressure level is executed also occur. Operations corresponding to the three cases are similar to the operations corresponding to the case 1, case 2, and case 3, and details are not described herein again.

It is to be noted that an initial dimension of flow control may be a user type, or may be a user traffic attribute. In other words, traffic entering the cache queue of the first port may be classified first based on the user traffic attribute. This is not limited in the embodiments. For example, an initial dimension of traffic control is a traffic type, and traffic entering the cache queue of the first port is classified, based on the traffic type, into game traffic, video traffic, and social traffic. When the flow control apparatus performs flow control on the foregoing three types of traffic, traffic of each traffic type is further classified, based on a user type, into a common user and a VIP user.

In conclusion, according to the flow control method provided in the embodiments, the first backpressure level is determined based on the congestion degree of the first port, and traffic entering the cache queue of the first port is controlled according to the flow control policy corresponding to the first backpressure level. The flow control policy is determined based on a user type and a user traffic attribute, and a granularity of flow control is refined to every user type. Therefore, the flow control method is highly flexible, has high precision, and has a small impact range. In this way, network congestion is handled, and QoS and service level agreement (SLA) quality of a high-level user type may be also ensured. The flow control method may be applied to networking deployment of a hierarchical QoS HQoS) application type and networking deployment of a slice user, which has a low networking requirement and has a wide application scope.

In a possible implementation, a flow control process is described by using an example in which a user type includes a common user and a VIP user, and a user traffic attribute includes a user level.

For example, correspondences between different backpressure levels and user types are shown in Table 3.

TABLE 3

| User type | User level ID | Port ID | Backpressure level ID | Backpressure state |
|---|---|---|---|---|
| Common user | 1 | 1 | Backpressure level 1 | 0/1 |
| Common user | 2 | 1 | Backpressure level 1 | 0/1 |
| VIP user | 1 | 1 | Backpressure level 2 | 0/1 |
| VIP user | 2 | 1 | Backpressure level 2 | 0/1 |

Refer to Table 3. The traffic of common user includes traffic of two user levels with user level IDs of 1 and 2. The user level ID is used to distinguish a user level of traffic. A backpressure level corresponding to the common user is a backpressure level 1, and a backpressure level corresponding to the VIP user is a backpressure level 2. A backpressure state 0 indicates that flow control is not performed, and a backpressure state 1 indicates that flow control has been performed.

After to-be-transmitted traffic arrives at the first port, the to-be-transmitted traffic is cached in the cache queue of the first port. In response to that a length of the cache queue of the first port reaches a backpressure generation threshold corresponding to the backpressure level 1, the backpressure level 1 is determined as a first backpressure level. The flow control generation module generates a first backpressure generation signal and sends the first backpressure generation signal to the flow control response module. The flow control response module adjusts backpressure states of a common user 1 (a common user whose user level ID is 1) and a common user 2 (a common user whose user level ID is 2) to 1 based on the received first backpressure generation signal. The hierarchical scheduling module sends the user level ID to the flow control response module, and queries a backpressure state of each user level based on the user level ID. In response to that the backpressure states of the common user 1 and the common user 2 are 1, the hierarchical scheduling module suppresses traffic of the common user 1 and traffic of the common user 2 from entering the cache queue of the first port, and traffic of a VIP user 1 (a VIP user whose user level ID is 1) and traffic of a VIP user 2 (a VIP user whose user level ID is 2) continue to enter the cache queue of the first port.

As the traffic entering the cache queue of the first port decreases, when a length of the cache queue of the first port after flow control is not greater than a backpressure cancellation threshold corresponding to the first backpressure level (a backpressure cancellation threshold corresponding to the backpressure level 1), the flow control generation module sends a first backpressure cancellation signal to the flow control response module, and the flow control response module adjusts the backpressure states of the common user 1 and the common user 2 to 0 based on the received first backpressure cancellation signal. The hierarchical scheduling module sends the user level ID to the flow control response module, obtains, through query based on the user level ID, that the backpressure states of the common user 1 and the common user 2 are 0, and cancels the control of the traffic of the common user 1 and the traffic of the common user 2, that is, restores the traffic of the common user 1 and the traffic of the common user 2 to enter the cache queue of the first port. In the foregoing flow control process, the traffic of the common user is controlled, and transmission of the traffic of the VIP user is not affected in the entire flow control process, thereby ensuring interaction experience of the VIP user.

Figure 4:
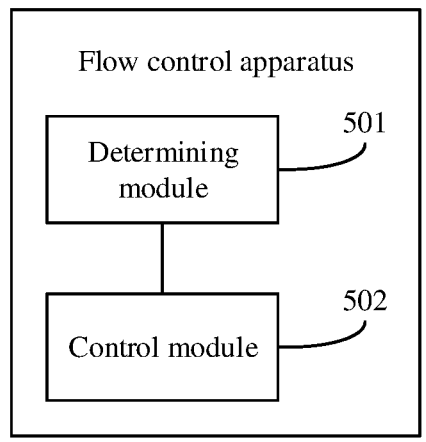
FIG. 4 is a schematic diagram of a structure of a flow control apparatus according to an embodiment.

The flow control method in the embodiments is described above. Corresponding to the method, an embodiment may further provide a flow control apparatus. FIG. 4 is a schematic diagram of a structure of a flow control apparatus according to an embodiment. Based on the following modules shown in FIG. 4, the flow control apparatus shown in FIG. 4 can perform all or some of the operations shown in FIG. 3. It should be understood that the apparatus may include more additional modules than the shown modules or omit some of the shown modules. This is not limited in the embodiments. As shown in FIG. 4, the apparatus includes: a determining module 501 and a control module 502.

The determining module 501 is configured to determine a first backpressure level of a first port, where the first backpressure level indicates a congestion degree of the first port.

The determining module 501 is further configured to determine a flow control policy corresponding to the first backpressure level, where the flow control policy is determined based on a user type and a user traffic attribute.

The control module 502 is configured to control, according to the flow control policy, traffic entering a cache queue of the first port, where different backpressure levels correspond to different flow control policies.

In a possible implementation, the determining module 501 is configured to determine, according to a case that a length of the cache queue of the first port is not less than a target backpressure generation threshold in at least one backpressure generation threshold, that a backpressure level corresponding to the target backpressure generation threshold is the first backpressure level, where different backpressure levels correspond to different backpressure generation thresholds.

In a possible implementation, the traffic entering the cache queue of the first port includes first user traffic and second user traffic that are of different user types, and a level of a user traffic attribute of the first user traffic is lower than a level of a user traffic attribute of the second user traffic; the determining module 501 is configured to determine that the flow control policy corresponding to the first backpressure level is a first flow control policy; and the control module 502 is configured to suppress, according to the first flow control policy, the first user traffic from entering the cache queue of the first port.

In a possible implementation, the control module 502 is configured to control the first user traffic to enter the cache queue of the first port based on a first transmission ratio, and control the second user traffic to enter the cache queue of the first port based on a second transmission ratio, where the first transmission ratio and the second transmission ratio are determined based on the user traffic attribute of the first user traffic and the user traffic attribute of the second user traffic, and the first transmission ratio is lower than the second transmission ratio.

In a possible implementation, the first user traffic includes first traffic and second traffic that are of different user traffic attributes, and the control module 502 is configured to control the first traffic to enter the cache queue of the first port based on the first transmission ratio, where a level of a user traffic attribute of the first traffic is higher than a level of a user traffic attribute of the second traffic.

In a possible implementation, the apparatus further includes: a cancellation module, configured to cancel, according to a case that a length of the cache queue of the first port after flow control is not greater than a backpressure cancellation threshold corresponding to the first backpressure level, control of the traffic entering the cache queue of the first port.

In a possible implementation, the determining module 501 is further configured to determine a second backpressure level of the first port based on a length of the cache queue of the first port after flow control, where the second backpressure level is higher than the first backpressure level, and determine a flow control policy corresponding to the second backpressure level; and the control module 502 is further configured to control, according to the flow control policy corresponding to the second backpressure level, the traffic entering the cache queue of the first port.

In a possible implementation, the user traffic attribute includes at least one of a user level, a traffic volume, and a traffic type.

The foregoing apparatus determines the first backpressure level based on the congestion degree of the first port, and controls, according to the flow control policy corresponding to the first backpressure level, traffic entering the cache queue of the first port. The flow control policy is determined based on a user type and a user traffic attribute, and a granularity of flow control is refined to every user type. Therefore, the flow control method is highly flexible, has high precision, and has a small impact range.

It should be understood that, when the apparatus provided in FIG. 4 implements functions of the apparatus, division into the foregoing functional modules is merely used as an example for description. During actual application, the foregoing functions may be allocated to different functional modules for implementation based on a requirement. In other words, a device is divided into different functional modules in terms of an inner structure, to implement all or some of the functions described above. In addition, the apparatuses provided in the foregoing embodiment and the method embodiments pertain to the same concept. For an implementation process of the apparatus, refer to the method embodiments. Details are not described herein again.

Figure 5:
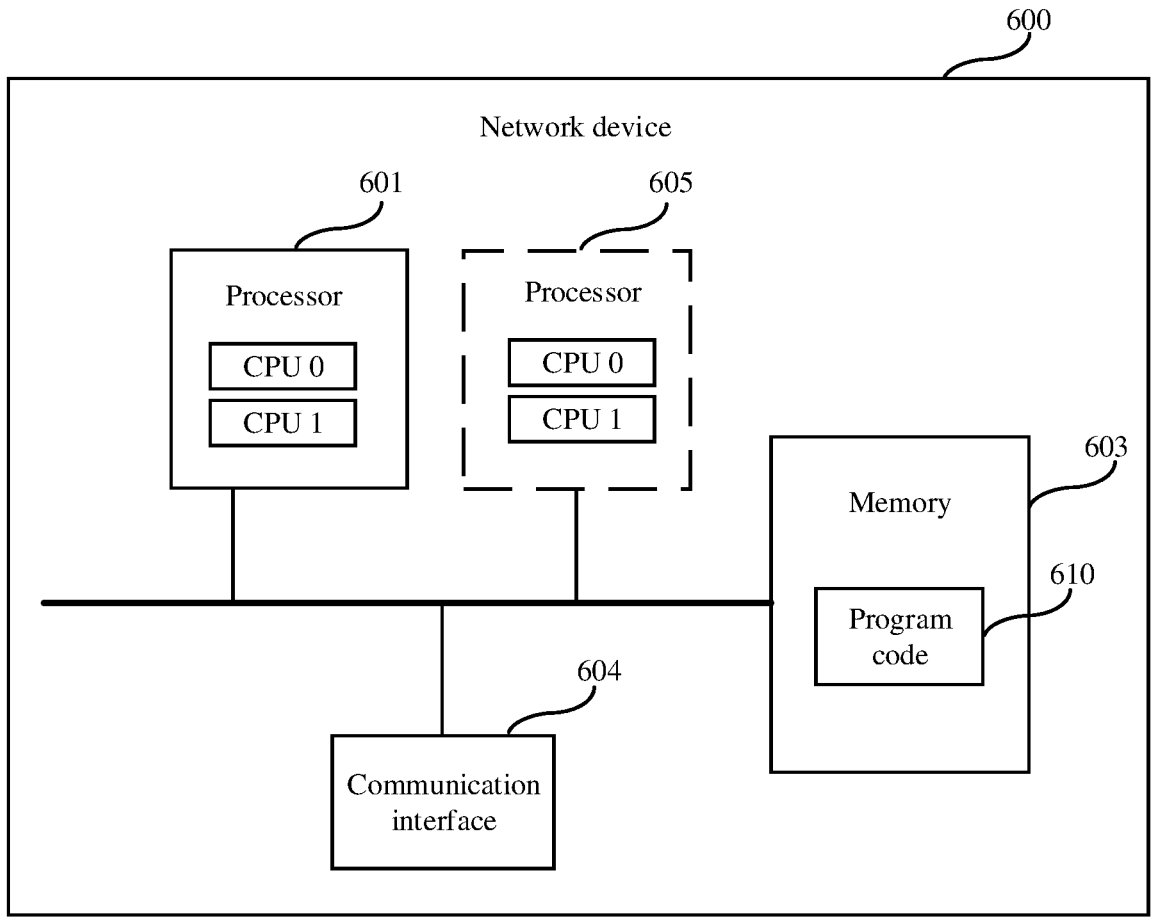
FIG. 5 is a schematic diagram of a structure of a network device according to an embodiment.

FIG. 5 is a schematic diagram of a structure of a network device 600 according to an example embodiment. The network device 600 shown in FIG. 5 is configured to perform operations involved in the flow control method shown in FIG. 3. The network device 600 is, for example, a switch or a router. The network device 600 may be implemented by using a general bus system structure.

As shown in FIG. 5, the network device 600 includes at least one processor 601, a memory 603, and at least one communication interface 604.

The processor 601 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions. For example, the processor 601 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), generic array logic (GAL), or any combination thereof. The processor may implement or execute various logical blocks, modules, and circuits described with reference to content in the embodiments. Alternatively, the processor may be a combination of processors implementing a computing function, for example, including a combination of one or more microprocessors, or a combination of a DSP and a microprocessor.

Optionally, the network device 600 further includes a bus. The bus is configured to transmit information between components of the network device 600. The bus may be a peripheral component interconnect (PCI) bus, an extended industry standard architecture (EISA) bus, or the like. The bus may include an address bus, a data bus, a control bus, and the like. For ease of representation, only one bold line is used to represent the bus in FIG. 5, but this does not mean that there is only one bus or only one type of bus.

For example, the memory 603 is a read-only memory (ROM) or another type of static storage device capable of storing static information and instructions, or a random access memory (RAM) or another type of dynamic storage device capable of storing information and instructions, or is an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium capable of carrying or storing expected program code in an instruction form or a data structure form and capable of being accessed by a computer. However, the memory is not limited thereto. For example, the memory 603 exists independently, and is connected to the processor 601 by a bus. Alternatively, the memory 603 may be integrated with the processor 601.

The communication interface 604 is any transceiver-type apparatus, and is configured to communicate with another device or a communication network. The communication network may be the Ethernet, a radio access network (RAN), a wireless local area network (WLAN), or the like. The communication interface 604 may include a wired communication interface and may further include a wireless communication interface. The communication interface 604 may be an Ethernet interface, a fast Ethernet (,FE) interface, a gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment, the communication interface 604 may be configured for the network device 600 to communicate with another device.

During implementation, in an embodiment, the processor 601 may include one or more CPUs, such as a CPU 0 and a CPU 1 in FIG. 5. Each of the processors may be a single-core processor (single-CPU) or a multi-core processor (multi-CPU). The processor herein may be one or more devices, circuits, and/or processing cores configured to process data (for example, computer program instructions).

During implementation, in an embodiment, the network device 600 may include a plurality of processors, such as a processor 601 and a processor 605 in FIG. 5. Each of the processors may be a single-core processor (single-CPU) or a multi-core processor (multi-CPU). The processor herein may be one or more devices, circuits, and/or processing cores configured to process data (for example, computer program instructions).

During implementation, in an embodiment, the network device 600 may further include an output device and an input device. The output device communicates with the processor 601 and may display information in a plurality of manners. For example, the output device may be a liquid crystal display (LCD), a light emitting diode (LED) display device, a cathode ray tube (CRT) display device, a projector, or the like. The input device communicates with the processor 601 and may receive an input by a user in a plurality of manners. For example, the input device may be a mouse, a keyboard, a touchscreen device, a sensing device, or the like.

In some embodiments, the memory 603 is configured to store program code 610 for performing the solutions, and the processor 601 may execute the program code 610 stored in the memory 603. In other words, the network device 600 may implement, by using the processor 601 and the program code 610 in the memory 603, the flow control method provided in the method embodiments. The program code 610 may include one or more software modules. Optionally, the processor 601 may store program code or instructions for performing the solutions.

In an embodiment, the network device 600 may correspond to the flow control device in the foregoing method embodiments.

The steps of the flow control method shown in FIG. 3 are implemented by using an integrated logic circuit of hardware in the processor of the network device 600, or by using instructions in a form of software. The steps of the method with reference to the embodiments may be directly performed by a hardware processor or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and performs the steps in the foregoing method in combination with the hardware in the processor. To avoid repetition, details are not described herein again.

Figure 6:
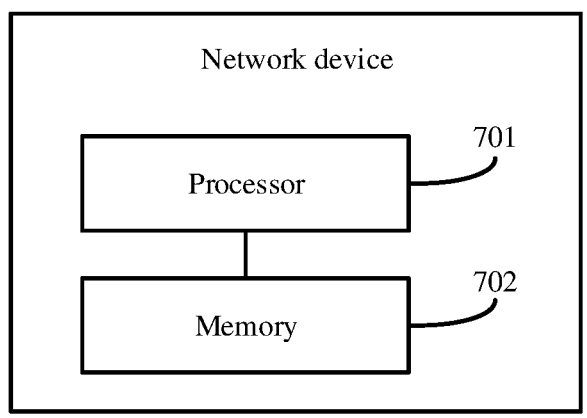
FIG. 6 is a schematic diagram of a structure of another network device according to an embodiment.

FIG. 6 is a schematic diagram of a structure of another network device according to an embodiment. The network device is, for example, a server. The server may differ greatly due to different configurations or performance, and may include one or more processors (CPUs) 701 and one or more memories 702. The one or more memories 702 store at least one computer program, and the at least one computer program is loaded and executed by the one or more processors 701, so that the server implements the flow control method provided in the method embodiment shown in FIG. 3. Further, the network device may further have components such as a wired or wireless network interface, a keyboard, and an input/output interface, so as to perform input/output. The network device may further include another component configured to implement a function of the device. Details are not described herein.

An embodiment may further provide a communication apparatus. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. In addition, when the processor executes the instructions stored in the memory, the processor performs the flow control method.

It should be understood that the processor may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor or any conventional processor. It is to be noted that the processor may be a processor that supports an advanced reduced instruction set computing machine (ARM) architecture.

Further, in an optional embodiment, the memory may include a read-only memory and a random access memory and may provide instructions and data for the processor. The memory may further include a nonvolatile random access memory. For example, the memory may further store information about a device type.

The memory may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is configured as an external cache. By way of example but not limitation, many forms of RAMs are configurable, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

An embodiment may further provide a non-transitory computer-readable storage medium. The non-transitory storage medium stores at least one instruction, and the instruction is loaded and executed by a processor, to cause a computer to implement the flow control method above.

An embodiment may further provide a computer program (product). When the computer program is executed by a computer, a processor or the computer may perform corresponding steps and/or procedures in the foregoing method embodiments.

An embodiment may further provide a chip, including a processor. The processor is configured to call, from a memory, and run instructions stored in the memory, to cause a communication device in which the chip is installed to perform the flow control method above.

An embodiment may further provide another chip, including an input interface, an output interface, a processor, and a memory. The input interface, the output interface, the processor, and the memory are connected to each other through an internal connection path. The processor is configured to execute code in the memory. When the code is executed, the processor is configured to perform the flow control method above.

All or some of the foregoing embodiments may be implemented by using software, hardware, firmware, or any combination thereof. When the embodiments are implemented by using the software, all or some of the embodiments may be implemented in a form of a computer program product. The computer program product includes one or more computer instructions. When the computer program instructions are loaded and executed on the computer, all or some of the procedures or functions may be generated. The computer may be a general-purpose computer, a dedicated computer, a computer network, or another programmable apparatus. The computer instructions may be stored in a non-transitory computer-readable storage medium or may be transmitted from a non-transitory computer-readable storage medium to another non-transitory computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

A person of ordinary skill in the art may be aware that, with reference to the embodiments, the method steps and the modules can be implemented by using software, hardware, firmware, or any combination thereof. To clearly describe the interchangeability between the hardware and the software, the steps and composition of each embodiment may be described above based on functions. Whether the functions are performed by hardware or software depends on particular applications and constraint conditions of the solutions. A person of ordinary skill in the art may use different methods to implement the described functions for each particular application, but it should not be considered that the implementation goes beyond the scope of the embodiments.

A person of ordinary skill in the art may understand that all or some of the steps of the foregoing embodiments may be implemented by hardware or a program instructing related hardware. The program may be stored in a non-transitory computer-readable storage medium. The storage medium may be a read-only memory, a magnetic disk, or an optical disc.

When the embodiments are implemented by using the software, all or some of the embodiments may be implemented in a form of a computer program product. The computer program product includes one or more computer program instructions. For example, the method in the embodiments may be described in a context of a machine-executable instruction. The machine-executable instruction is included in, for example, a program module executed in a device on a real or virtual processor of a target. The program module may include a routine, a program, a library, an object, a class, a component, a data structure, and the like, and executes a task or implements an abstract data structure. In various embodiments, functions of program modules may be combined or split between the described program modules. The machine-executable instruction for the program module may be executed locally or within a distributed device. In the distributed device, the program module may be located in both a local storage medium and a remote storage medium.

Computer program code used to implement the method in the embodiments may be written in one or more programming languages. The computer program code may be provided for a processor of a general-purpose computer, a dedicated computer, or another programmable flow control apparatus, so that when the program code is executed by the computer or another programmable flow control apparatus, a function/operation specified in the flowchart and/or the block diagram is implemented. The program code may be executed all on a computer, partially on a computer, as an independent software package, partially on a computer and partially on a remote computer, or all on a remote computer or server.

In a context of the embodiments, the computer program code or related data may be carried by any appropriate carrier, so that a device, an apparatus, or a processor can perform various processing and operations described above. For example, the carrier includes a signal, a non-transitory computer-readable medium, and the like.

The non-transitory machine-readable medium may be any tangible medium that includes or stores a program used for or related to an instruction execution system, apparatus, or device. The non-transitory machine-readable medium may be or a machine-readable storage medium. The non-transitory machine-readable medium may include, but is not limited to an electronic, magnetic, optical, electromagnetic, infrared, or semiconductor system, apparatus, or device, or any appropriate combination thereof. More detailed examples of the machine-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any appropriate combination thereof.

It may be clearly understood by a person skilled in the art that, for convenient and brief description, for a detailed working process of the foregoing system, device, and module, refer to a corresponding process in the foregoing method embodiments. Details are not described herein.

In the several embodiments, it should be understood that the system, device, and method may be implemented in other manners. For example, the described device embodiment is merely an example. For example, the module division is merely logical function division and may be other division during actual implementation. For example, a plurality of modules or components may be combined or integrated into another system, or some features may be omitted or not performed. In addition, the displayed or discussed mutual couplings or direct couplings or communication connections may be implemented through some interfaces, and the indirect couplings or communication connections between the devices or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions in the embodiments.

In addition, functional modules in embodiments may be integrated into one processing module, or each of the modules may exist alone physically, or two or more modules may be integrated into one module. The integrated module may be implemented in a form of hardware or may be implemented in a form of a software functional module.

When the integrated module is implemented in the form of a software functional module and sold or used as an independent product, the integrated module may be stored in a computer-readable storage medium. Based on such an understanding, the embodiments may be implemented in the form of a software product. The computer software product is stored in a storage medium and includes several instructions to cause a computer device (which may be a personal computer, a server, a network device, or the like) to perform all or some of the steps of the method in the embodiments. The foregoing storage medium includes any medium that can store program code, such as a USB flash drive, a removable hard disk, a read-only memory (ROM), a random access memory (RAM), a magnetic disk, or an optical disc.

The terms "first", "second", and the like are used to distinguish between same or similar items whose effects and functions are basically the same. It should be understood that there is no logical or time-sequence dependency among "first", "second", and "nth", and a quantity and an execution sequence are not limited. It should also be understood that although the terms such as "first" and "second" are used in the following description to describe various elements, these elements should not be limited by the terms. These terms are merely used to distinguish one element from another element. For example, without departing from the scope of the various examples, a first image may be referred to as a second image, and similarly, a second image may be referred to as a first image. Both the first image and the second image may be images, and in some cases, may be separate and different images.

It should be further understood that sequence numbers of processes do not mean execution sequences in the embodiments. The execution sequences of the processes should be determined based on functions and internal logic of the processes and should not be construed as any limitation on the implementation processes of the embodiments.

the term "at least one" means one or more, and the term "a plurality of" means two or more. For example, a plurality of second packets may mean two or more second packets. The terms "system" and "network" may be used interchangeably ion.

It should be understood that the terms used in the descriptions of various examples are merely intended to describe examples but are not intended to constitute a limitation. The terms "one" ("a" and "an") and "the" of singular forms are also intended to include plural forms, unless otherwise specified in the context clearly.

It should be further understood that, the term "and/or" indicates and includes any or all possible combinations of one or more items in associated listed items. The term "and/or" describes an association relationship between associated objects and represents that three relationships may exist. For example, A and/or B may represent the following three cases: only A exists, both A and B exist, and only B exists. In addition, the character "/" may indicate an "or" relationship between associated objects.

It should be further understood that the term "include" (or "includes", "including", "comprises", and/or "comprising"), when used, specifies the presence of stated features, integers, steps, operations, elements, and/or components, but does not preclude the presence or addition of one or more other features, integers, steps, operations, elements, components, and/or groups thereof.

It should be further understood that the term "if" may be interpreted as a meaning "when" ("upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that determining B based on A does not mean that B is determined only based on A, but B may be determined based on A and/or other information.

It should further be understood that "one embodiment", "an embodiment", or "a possible implementation" means that particular features, structures, or characteristics related to the embodiments or implementations are included in at least one embodiment. Therefore, "in one embodiment", "in an embodiment", or "in a possible implementation" does not necessarily mean a same embodiment. In addition, these particular features, structures, or characteristics may be combined in one or more embodiments in any appropriate manner.

What is claimed is:

1. A flow control method, comprising:
   determining, by a flow control apparatus, a first backpressure level of a first port, wherein the first backpressure level indicates a congestion degree of the first port;
   determining a flow control policy corresponding to the first backpressure level, wherein the flow control policy is determined based on a user type and a user traffic attribute; and
   controlling, according to the flow control policy, traffic entering a cache queue of the first port, wherein different backpressure levels correspond to different flow control policies,
   wherein the traffic entering the cache queue of the first port comprises first user traffic and second user traffic that are of different user types, and a level of a user traffic attribute of the first user traffic is lower than a level of a user traffic attribute of the second user traffic; and determining the flow control policy corresponding to the first backpressure level further comprises:

determining that the flow control policy corresponding to the first backpressure level is a first flow control policy; and controlling, according to the flow control policy, traffic entering the cache queue of the first port further comprises:

suppressing, according to the first flow control policy, the first user traffic from entering the cache queue of the first port.

2. The flow control method according to claim 1, wherein the determining, by the flow control apparatus, the first backpressure level of the first port further comprises:

determining, according to a case that a length of the cache queue of the first port is not less than a target backpressure generation threshold in at least one backpressure generation threshold, that a backpressure level corresponding to the target backpressure generation threshold is the first backpressure level, wherein different backpressure levels correspond to different backpressure generation thresholds.

3. The flow control method according to claim 1, wherein suppressing, according to the first flow control policy, the first user traffic from entering the cache queue of the first port further comprises:

controlling the first user traffic to enter the cache queue of the first port based on a first transmission ratio, and controlling the second user traffic to enter the cache queue of the first port based on a second transmission ratio, wherein the first transmission ratio and the second transmission ratio are determined based on the user traffic attribute of the first user traffic and the user traffic attribute of the second user traffic, and the first transmission ratio is lower than the second transmission ratio.

4. The flow control method according to claim 3, wherein the first user traffic comprises first traffic and second traffic that are of different user traffic attributes, and controlling the first user traffic to enter the cache queue of the first port based on the first transmission ratio further comprises:

controlling the first traffic to enter the cache queue of the first port based on the first transmission ratio, wherein a level of a user traffic attribute of the first traffic is higher than a level of a user traffic attribute of the second traffic.

5. The flow control method according to claim 1, wherein after controlling, according to the flow control policy, the traffic entering the cache queue of the first port, the method further comprises:

canceling, according to a case that a length of the cache queue of the first port after flow control is not greater than a backpressure cancellation threshold corresponding to the first backpressure level, control of the traffic entering the cache queue of the first port.

6. The flow control method according to claim 1, wherein after controlling, according to the flow control policy, the traffic entering the cache queue of the first port, the method further comprises:

determining a second backpressure level of the first port based on a length of the cache queue of the first port after flow control, wherein the second backpressure level is higher than the first backpressure level;

determining a flow control policy corresponding to the second backpressure level; and controlling, according to the flow control policy corresponding to the second backpressure level, the traffic entering the cache queue of the first port.

7. The flow control method according to claim 1, wherein the user traffic attribute comprises at least one of a user level, a traffic volume, or a traffic type.

8. A flow control apparatus, comprising:

a non-transitory memory storing instructions; and a processor coupled to the non-transitory memory; wherein the instructions, when executed by the processor, cause the apparatus to be configured to:

determine a first backpressure level of a first port, wherein the first backpressure level indicates a congestion degree of the first port, determine a flow control policy corresponding to the first backpressure level, wherein the flow control policy is determined based on a user type and a user traffic attribute; and control, according to the flow control policy, traffic entering a cache queue of the first port, wherein different backpressure levels correspond to different flow control policies, wherein the traffic entering the cache queue of the first port comprises first user traffic and second user traffic that are of different user types, and a level of a user traffic attribute of the first user traffic is lower than a level of a user traffic attribute of the second user traffic;

wherein the instructions, when executed by the processor, further cause the apparatus to be configured to:

determine that the flow control policy corresponding to the first backpressure level is a first flow control policy; and suppress, according to the first flow control policy, the first user traffic from entering the cache queue of the first port.

9. The flow control apparatus according to claim 8, wherein the instructions, when executed by the processor, further cause the apparatus to be configured to:

determine, according to a case that a length of the cache queue of the first port is not less than a target backpressure generation threshold in at least one backpressure generation threshold, that a backpressure level corresponding to the target backpressure generation threshold is the first backpressure level, wherein different backpressure levels correspond to different backpressure generation thresholds.

10. The flow control apparatus according to claim 8, wherein the instructions, when executed by the processor, further cause the apparatus to be configured to:

control the first user traffic to enter the cache queue of the first port based on a first transmission ratio, and control the second user traffic to enter the cache queue of the first port based on a second transmission ratio, wherein the first transmission ratio and the second transmission ratio are determined based on the user traffic attribute of the first user traffic and the user traffic attribute of the second user traffic, and the first transmission ratio is lower than the second transmission ratio.

11. The flow control apparatus according to claim 10, wherein the first user traffic comprises first traffic and second traffic that are of different user traffic attributes, and the instructions, when executed by the processor, further cause the apparatus to be configured to:

control the first traffic to enter the cache queue of the first port based on the first transmission ratio, wherein a level of a user traffic attribute of the first traffic is higher than a level of a user traffic attribute of the second traffic.

12. The flow control apparatus according to claim 8, wherein the instructions, when executed by the processor, further cause the apparatus to be configured to:
cancel, according to a case that a length of the cache queue of the first port after flow control is not greater than a backpressure cancellation threshold corresponding to the first backpressure level, control of the traffic entering the cache queue of the first port.

13. The flow control apparatus according to claim 8, wherein the instructions, when executed by the processor, further cause the apparatus to be configured to:
determine a second backpressure level of the first port based on a length of the cache queue of the first port after flow control, wherein the second backpressure level is higher than the first backpressure level, and determine a flow control policy corresponding to the second backpressure level; and
control, according to the flow control policy corresponding to the second backpressure level, the traffic entering the cache queue of the first port.

14. The flow control apparatus according to claim 8, wherein the user traffic attribute comprises at least one of a user level, a traffic volume, and a traffic type.

15. A non-transitory computer-readable storage medium, storing at least one instruction, wherein the at least one instruction is loaded and executed by a processor to implement:
determining, by a flow control apparatus, a first backpressure level of a first port, wherein the first backpressure level indicates a congestion degree of the first port;
determining a flow control policy corresponding to the first backpressure level, wherein the flow control policy is determined based on a user type and a user traffic attribute; and
controlling, according to the flow control policy, traffic entering a cache queue of the first port, wherein different backpressure levels correspond to different flow control policies,
wherein the traffic entering the cache queue of the first port comprises first user traffic and second user traffic that are of different user types, and a level of a user traffic attribute of the first user traffic is lower than a level of a user traffic attribute of the second user traffic;
wherein the at least one instruction is loaded and executed by the processor to further implement:
determining that the flow control policy corresponding to the first backpressure level is a first flow control policy; and
suppressing, according to the first flow control policy, the first user traffic from entering the cache queue of the first port.

16. The non-transitory computer-readable storage medium according to claim 15, wherein the at least one instruction is loaded and executed by the processor to further implement:
determining, according to a case that a length of the cache queue of the first port is not less than a target backpressure generation threshold in at least one backpressure generation threshold, that a backpressure level corresponding to the target backpressure generation threshold is the first backpressure level, wherein different backpressure levels correspond to different backpressure generation thresholds.

17. The non-transitory computer-readable storage medium according to claim 15, wherein the at least one instruction is loaded and executed by the processor to further implement:
controlling the first user traffic to enter the cache queue of the first port based on a first transmission ratio, and controlling the second user traffic to enter the cache queue of the first port based on a second transmission ratio, wherein the first transmission ratio and the second transmission ratio are determined based on the user traffic attribute of the first user traffic and the user traffic attribute of the second user traffic, and the first transmission ratio is lower than the second transmission ratio.

\* \* \* \* \*